Patented Jan. 14, 1947

2,414,195

UNITED STATES PATENT OFFICE 2,414,195

PROCESS FOR OBTAINING INCREASED YIELDS IN THE EXTRACTION OF CORN PROTEINS

Cyril D. Evans and Chester W. Ofelt, Peoria, Ill., assignors to United States of America, as represented by the Secretary of Agriculture No Drawing. Application April 20, 1944, Serial No. 531,968

6 Claims. (Cl. 260—112)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

This invention relates to the extraction of corn proteins, and has among its objects the provision of a method for obtaining increased yields in the extraction of such proteins.

Methods heretofore commonly used for the extraction of corn proteins have been based essentially on the use of alcohol as an extraction medium. The yields obtainable from such methods, however, are limited. Yields of 45 to 65 percent of the total nitrogen present in crude corn gluten are usual, and it has been reported (Swallen, Ind. Eng. Chem., 33, 394–398 (1941)) that yields slightly in excess of 75 percent of total nitrogen are maximum.

It appears that alkali extraction methods are subject to similar limitations, the maximum yields obtainable at any alkali concentration being approximately 64 percent of the total nitrogen. We have found, however, that a method employing alcohol treatment followed by alkali extraction results in yields of 98 percent or more of the total nitrogen present. Apparently this result is due to the fact that the pretreatment with alcohol performs a specific function, i. e., the breaking down of the protein complex thus making available protein material which previously could not be removed by alkali solvents. This hypothesis was verified by the following experiments.

EXAMPLE I 10 g. of crude corn gluten (8.3 percent N) was wetted with 20 ml. of 80 percent isopropyl alcohol. This mixture was heated for 15 minutes at a temperature below the boiling point of the alcohol and then extracted with 200 ml. of 0.15 N potassium hydroxide solution. A 98.0 percent extraction of the total nitrogen was obtained. The procedure followed in this example is referred to in the tabulated data which appear below as Method I.

The following experiments were performed to show that the alcohol does not act as a principal agent in the protein removal.

EXAMPLE II 10 g. of crude gluten (8.3 percent N) was wetted with 20 ml. of 80 percent isopropyl alcohol. The mixture was heated for 15 minutes at a temperature below the boiling point of the alcohol, and the solvent was then removed. The dried material was reground and then extracted with 200 ml. of 0.15 N potassium hydroxide solution. Extraction of 98.8 percent of the total nitrogen was obtained. The procedure followed in this example is referred to in the tabulated data which appear below as Method II.

EXAMPLE III 10 g. of crude gluten (8.3 percent N) was extracted with a mixture of 20 ml. 80 percent isopropyl alcohol and 200 ml. of 0.15 N potassium hydroxide solution. This procedure resulted in extraction of only 62.2 percent of the total nitrogen. This result compares closely with a yield of 62.6 percent obtained by extraction with alkali alone.

Other aqueous alcohols, as well as aqueous acetone, and anhydrous alcoholic binary mixtures have been used as pretreating media. Results of all extraction experiments are summarized in Table I. These results indicate that any system which has the ability to dissolve zein may be used as a pretreating medium.

Table I.—Percent of total nitrogen extracted from corn gluten by various pretreatments followed by extraction with weak alkali

| Parts of crude gluten | Pretreatment | | Amounts and normality of alkali used in extraction | Per cent of total nitrogen extracted | |
|---|---|---|---|---|---|
| | Parts of pretreating agent | Pretreating agent used | | Method I [1] | Method II [1] |
| 10 | None | None | 200 parts 0.15 N potassium hydroxide | 62.6 | |
| 10 | None | ....do | 200 parts 0.15 N potassium hydroxide plus 20 parts of 80% isopropyl alcohol. | 62.2 | |
| 10 | 20 | Absolute methyl alcohol | 200 parts 0.15 N potassium hydroxide | 62.7 | 65.3 |
| 10 | 20 | 80% methyl alcohol | ....do | 77.1 | 86.4 |
| 10 | 20 | 95% ethyl alcohol | ....do | 74.4 | |
| 10 | 20 | 80% ethyl alcohol | ....do | 85.8 | |
| 10 | 20 | Anhydrous isopropyl alcohol | ....do | 70.9 | 96 |
| 10 | 20 | 80% isopropyl alcohol | ....do | 98 | 98.8 |
| 10 | 25 | ....do | 200 parts 0.15 N sodium hydroxide | 96.1 | |
| 10 | 25 | ....do | 200 parts 0.18 N potassium hydroxide | 93.9 | |
| 10 | 25 | ....do | 200 parts 0.22 N potassium hydroxide | 91.2 | |
| 10 | 25 | ....do | 200 parts 0.1 N potassium hydroxide | 97.4 | |
| 10 | 25 | 65% isopropyl alcohol | 200 parts 0.15 N potassium hydroxide | 99.6 | |
| 10 | 25 | 50% isopropyl alcohol | ....do | 100 | |
| 10 | 20 | 75% secondary butyl alcohol | ....do | 96.4 | 97.1 |
| 10 | 20 | 70% aqueous acetone | ....do | 82.6 | 79.4 |
| 10 | 25 | 70% aqueous dioxane | ....do | 99.6 | |
| 10 | 25 | Methyl cellosolve | ....do | 81.6 | |
| 10 | 25 | 40/60 of ethyl alcohol/ethylene dichloride. | ....do | 98.5 | |

[1] See Examples I and II.

The process disclosed in the present application thus provides a method for extracting corn proteins from commercial corn gluten with much higher yields than has heretofore been possible. This process is based upon the recognition of the true function of the alcohol, or other pretreating medium, namely, the splitting of the protein complex to make more protein available to solution in alkali. The alcohol is accordingly used for this purpose in a pretreating step rather than in large amounts as an extraction medium. The fact that the alcohol may be driven off and recovered without affecting the yield of extracted protein is of considerable importance from the point of view of extraction economics.

The data presented in Table I indicate in summary the range of aqueous alcohols that are usable. Thus, either ethyl or isopropyl alcohol is shown to give good results over a wide range of concentrations. Likewise, aqueous acetone and aqueous dioxane solutions are acceptable as pretreating media, and secondary butyl alcohol is shown to yield a very high protein extract.

Variations from 0.1 N to 0.22 N in the concentration of alkali used to extract the protein are illustrated in Table I. These limits cover the range of maximum extraction. However, alkali concentrations as low as 0.03 N may be used with some reduction in yield and a slight increase in the time required for extraction. The equivalence of sodium and potassium hydroxide is also shown. The hydroxides of ammonium and calcium are not acceptable, as extractions cannot be made with these alkalis.

Table I also shows the use of anhydrous zein solvents, such as "methyl cellosolve," the monoethyl ether of ethylene glycol, as pretreating media. Likewise, anhydrous binary alcohol systems can be used as pretreating media, as shown by the high extraction obtained with a 40/60 mixture of ethyl alcohol and ethylene dichloride.

Zein solvents which are applicable as pretreating media are very extensive and may include any of the following. As a single component pretreating medium, any of the lower glycols or polyglycols or their monoethers or monoesters may be used. Likewise, benzyl alcohol or tetrahydrofurfuryl alcohol are zein solvents and may be used as a pretreating agent. Other hydroxy compounds that are zein solvents and could be used are the alkanolamines, such as ethanolamine, and halohydrins, such as ethylene chlorohydrin. The anhydrous binary alcohol systems are also very extensive and include such systems as alcohols and chlorinated paraffins, alcohols and nitroparaffins, alcohols and the lower glycols and their monoethers and monoesters. Also, many other systems, such as methyl alcohol and benzene, methyl alcohol and propylene oxide, methyl alcohol and dioxane, could be used as pretreating media. The type and number of zein solvents available is further illustrated in Evans and Manley, Solvents for Zein, Ind. Eng. Chem., 33, 1416 (1941), and Manley and Evans, Binary Solvents for Zein, Ind. Eng. Chem., 35, 661 (1943).

For economic reasons, the aqueous pretreating media are the most acceptable; however, the anhydrous systems also have very definite possibilities. The use of the method disclosed herein also allows a high percentage recovery of the starch in the crude gluten which makes the procedure attractive for increased yields of starch as well as the significant improvement in the extraction of protein.

Having thus described our invention, we claim:

1. The process of extracting corn proteins from crude corn gluten which comprises wetting the crude corn gluten with an organic zein solvent, heating the resulting mixture at a temperature below the boiling point of the solvent, removing the solvent and then extracting the corn protein from the resulting product solely with an aqueous solution of an alkali selected from the group consisting of sodium and potassium hydroxide.

2. The process of extracting corn proteins from crude corn gluten which comprises wetting the crude corn gluten with an organic zein solvent, heating the resulting mixture for about 15 minutes at a temperature below the boiling point of the solvent, and then extracting the corn proteins from the resulting mixture solely with an 0.1 to 0.22 N aqueous solution of an alkali selected from the group consisting of sodium and potassium hydroxide.

3. The process of extracting corn proteins from crude corn gluten which comprises wetting the crude corn gluten with an alcoholic zein solvent, heating the resulting mixture for about 15 minutes at a temperature below the boiling point of the solvent, and then extracting the corn proteins from the resulting mixture solely with an 0.1 to 0.22 N aqueous solution of an alkali selected from the group consisting of sodium and potassium hydroxide.

4. The process of extracting corn proteins from crude corn gluten which comprises wetting the crude corn gluten with ethyl alcohol, heating the resulting mixture for a period of about 15 minutes at a temperature below the boiling point of the alcohol, and then extracting the corn proteins from the resulting mixture solely with an 0.1 to 0.22 N aqueous solution of an alkali selected from the group consisting of sodium and potassium hydroxide.

5. The process of extracting corn proteins from crude corn gluten which comprises wetting the crude corn gluten with isopropyl alcohol, heating the resulting mixture for about 15 minutes at a temperature below the boiling point of the alcohol, and then extracting the corn proteins from the resulting mixture solely with an 0.1 to 0.22 N aqueous solution of an alkali selected from the group consisting of sodium and potassium hydroxide.

6. The process of extracting corn proteins from crude corn gluten which comprises wetting the crude corn gluten with secondary butyl alcohol, heating the resulting mixture for about 15 minutes at a temperature below the boiling point of the alcohol, and then extracting the corn proteins from the resulting mixture solely with an 0.1 to 0.22 N aqueous solution of alkali selected from the group consisting of sodium and potassium hydroxide.

CYRIL D. EVANS.
CHESTER W. OFELT.